United States Patent
Schmit et al.

(10) Patent No.: US 8,270,476 B2
(45) Date of Patent: Sep. 18, 2012

(54) FACE DETECTION SYSTEM FOR VIDEO ENCODERS

(75) Inventors: Michael L. Schmit, Cupertino, CA (US); Raja Koduri, Santa Clara, CA (US); Carrell Ray Killebrew, Saratoga, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 914 days.

(21) Appl. No.: 12/347,927

(22) Filed: Dec. 31, 2008

(65) Prior Publication Data

US 2010/0166055 A1 Jul. 1, 2010

(51) Int. Cl.
 *H04N 7/50* (2006.01)
(52) U.S. Cl. .................................... 375/240.1
(58) Field of Classification Search ............. 375/240.01, 375/240.02, 240.08, 240.18, 240.24, 240.25; 382/232, 239
See application file for complete search history.

(56) References Cited

U.S. PATENT DOCUMENTS

| | | | |
|---|---|---|---|
| 5,512,939 A * | 4/1996 | Zhou | 348/14.12 |
| 2002/0141650 A1* | 10/2002 | Keeney et al. | 382/239 |
| 2007/0030896 A1* | 2/2007 | Comaniciu et al. | 375/240.08 |
| 2008/0260042 A1* | 10/2008 | Shah et al. | 375/240.25 |

* cited by examiner

*Primary Examiner* — Gilberto Barron, Jr.
*Assistant Examiner* — Malcolm Cribbs
(74) *Attorney, Agent, or Firm* — Volpe and Koenig, P.C.

(57) ABSTRACT

Embodiments include a codec for use in a videoconferencing or similar system includes a video encoder pipeline that has a pre-processor component that is optimized to detect faces and compress the facial video data in an optimum manner. The codec has a pre-processing step that analyzes each frame on a per macroblock basis to determine the mathematical activity level per block. The activity level calculation is used as a parameter to the bitrate control module of the encoder to control the quantization, and thus the fine grained quality of the output data. An object detection module (e.g., a face detector) is placed in the pre-processing step. The object detection data is then combined with the activity level and object detection certainty value through a combinatorial algorithm comprising a weighted average or normalized multiplication process.

13 Claims, 5 Drawing Sheets

400

|  |  |  |
|---|---|---|
| 25 | 50 | 25 |
| 40 | 100 | 75 |
| 75 | 50 | 25 |
|  |  |  |

NO IMPORTANCE                                       FULL IMPORTANCE 1.0/1.0 F/NF                                              1.0/0.1 F/NF

FACE DETECTION SYSTEM FOR VIDEO ENCODERS

TECHNICAL FIELD

The disclosed embodiments relate generally to video display technology, and more specifically to methods and systems for detecting faces in videoconferencing systems.

BACKGROUND OF THE DISCLOSURE

Videoconferencing technology comprises a set of interactive telecommunication technologies that allow two or more parties of people at remote locations to interact simultaneously through two-way video and audio transmissions. Videoconferencing is used not only to provide audio and video transmission of meeting activities and people, but is also to share documents, computer-displayed information, demonstrations, performances, and the like. To reduce the amount of data transmitted in video systems, the data is often compressed through a coding scheme. For IP (Internet Protocol) based videoconferencing systems, the key components include the codecs (coder/decoder) that enable the digital compression of audio and video data streams in real time.

A video codec is a device or firmware/software program that compresses and/or decompresses the digital video data transmitted between a transmitter and receiver. For videoconferencing, and similar applications, specially developed hardware or software-based codec (coder/decoder) have provided compression rates of up to 1:500. The compression schemes for codecs usually employ lossy data compression in which a much smaller compressed file is produced compared to a lossless compression method.

In lossy transform codecs, samples of picture or sound are taken, chopped into small segments, transformed into a new basis space, and quantized. The resulting quantized values are then entropy coded. In lossy predictive codecs, previous and/or subsequent decoded data is used to predict the current sound sample or image frame. The error between the predicted data and the real data, together with any extra information needed to reproduce the prediction, is then quantized and coded. Lossy methods are most often used for compressing sound, images or videos, but lossless compression is typically required for text. Lossless compression is used when it is important that the original and the decompressed data be identical, or when no assumption can be made on whether certain deviation is uncritical.

A videoconferencing environment is generally characterized by a relatively static background scene (e.g., a conference room) with a specific focused area of activity or object of interest, such as a particular person or a demonstration. Many other video environments exhibit similar characteristics, such as video surveillance systems, video security/monitoring, webcam setups, and the like, in which a specific event or event type is to be detected, or a specific object is to be focused on. Such systems are also typified by the use of equipment that may have varying levels of quality, such as cameras, modems, routers, playback devices, application software, and so on. The transmission link between the sites may also be quite varied, from high speed network links (e.g., T1, ISDN, etc.) to low bandwidth transmission links (e.g., analog telephone or POTS). Because of these variables, the compression of the audio and video data must be optimized to ensure the highest quality of data transmission possible.

Videoconferencing codecs thus have several difficult requirements that must be satisfied all at once. They must have a very low latency (high speed) and have a very low bitrate to fit into a small bandwidth and to accommodate short latencies of the transmission system. Because of these prime constraints, the quality of the video is usually quite low when there is fast motion, even though this may happen relatively rarely in a typical video conference setting.

In a typical videoconference session, the key area of focus is a person's face. Present videoconferencing systems or similar systems used for other applications generally do not optimize the compression method for a particular areas of focus, especially subject faces. For example, most videoconferencing systems work relatively well as long as there is relatively little movement within a scene. As soon as a person or other object moves, however, the images often become quite blocky (pixelation effects) or exhibit other compression-related deficiencies, such as blocking and ringing. In this case, focus may be lost in certain crucial areas, since all areas are treated the same in the compression algorithm. Such systems do not adequately isolate particular areas of interest within a scene in a manner that maintains a high quality transmission for those areas.

What is desired, therefore, is a videoconferencing, or similar application system that optimizes compression for faces or other focused regions of interest within a greater scene.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
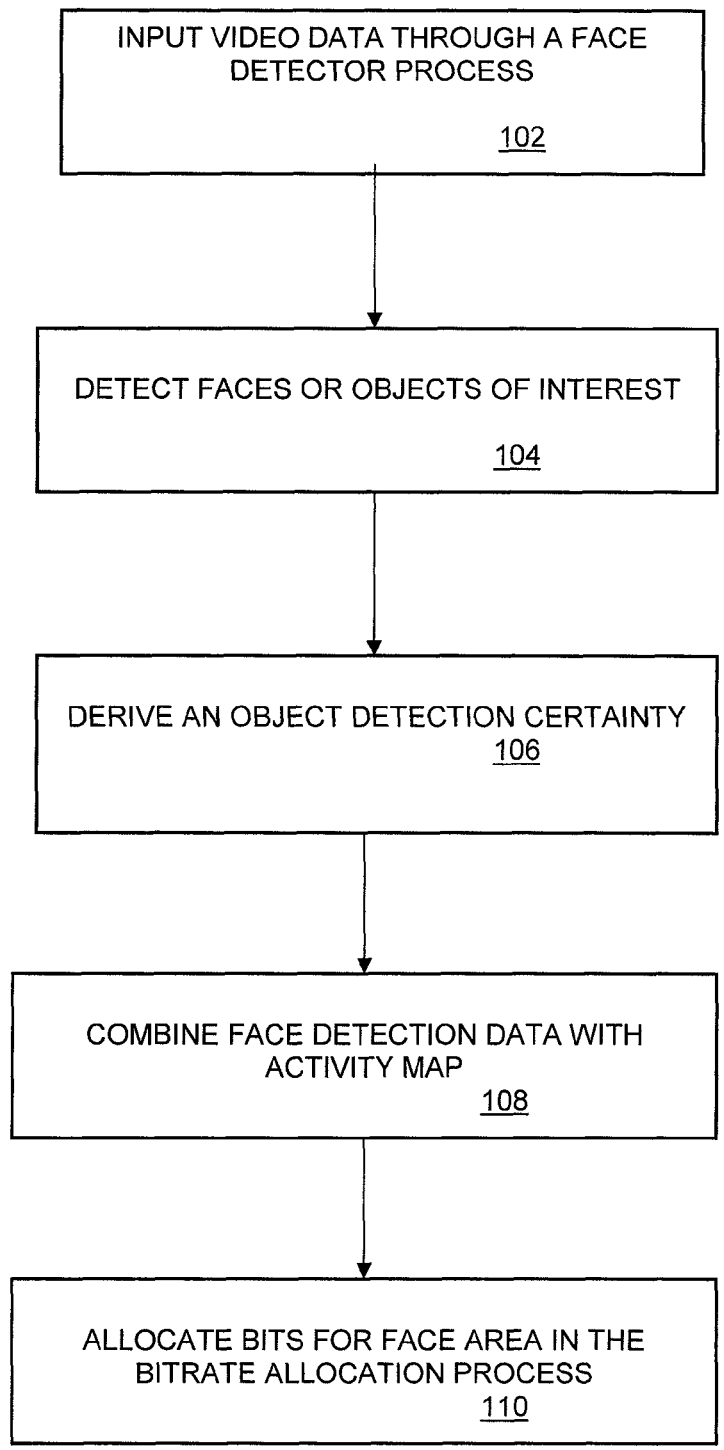
FIG. 1 is a flowchart that illustrates an overall method of detecting subject faces in a videoconferencing system, under an embodiment.

Embodiments of the invention as described herein provide a solution to the problems of conventional methods as stated above. In the following description, various examples are given for illustration, but none are intended to be limiting. Embodiments include an improved quality video encoder for videoconferencing or similar applications. The video encoder is optimized to recognize subject faces in a scene and optimally encode the face data for transmission over a network. In an embodiment, the method works by detecting faces and applying more weight to the motion of the faces in the allocation of bits in the encoding process.

In MPEG-based video compression systems, the minimum independently encoded rectangle on the frame is called macroblock, and has a size of 16×16 pixels, and each frame has a periodicity of $\frac{1}{30}$ of a second. Certain systems perform compression by statistically analyzing the whole frame of 16×16 pixels to determine a level of activity ranging from none or very little activity to much activity. Standard compression systems generally assign low weight to pixels that show relatively little activity. For full motion video, this type of analysis is usually adequate to perform compression in which perceptually insignificant information is discarded and human perception is relied upon to fill-in the missing data so that the compressed image appears identical to the original uncompressed version.

There are several different ways to construct a video encoder. Encoder standards generally do not specify exactly how they are to function, but rather only specify the syntax that the output encoded bitstream must adhere to. The quality of an encoder can be judged in several ways. For example, one metric is to find the lowest number of bits (bitrate) to describe a motion video scene with the same or better level of quality as another encoder. In videoconferencing applications, codecs must exhibit low latency (high speed) and have a very low bitrate to accommodate any shortcomings in the transmission system. In general, every codec can give a varying degree of quality for a given set of frames within a video sequence. Typically, the quality is controlled through a bitrate control mechanism (bitrate allocation) that sets the bitrate and quality on a per-frame basis. Alternatively, different types of frames such as key frames and non-key frames can be used to control compression.

In one embodiment, a codec for use in a videoconferencing or similar system includes a video encoder pipeline that has a pre-processor component that is optimized to detect faces and compress the facial video data as a high quality image. This embodiment capitalizes on the present resources of most video codecs that contain a pre-processing step that analyzes each frame on a per macroblock basis to determine the mathematical activity level per block. The activity level calculation is used as a parameter to the bitrate control module of the encoder to control the quantization, and thus the fine grained quality of the output data. An object detection module (e.g., a face detector) is placed in the pre-processing step. The object detection data is then combined through a combinatorial logic algorithm (e.g., weighted average or multiplication with a normalized result) with the activity level and a measure of the object detection certainty. This data is then provided to a bitrate allocation module to provide an appropriate weight to the face data for encoding.

FIG. 1 is a flowchart that illustrates an overall method of detecting subject faces in a videoconferencing system, under an embodiment. Input video data from a transmitter source, such as a digital video camera or a digitized video stream is input into an encoder pipeline. The input data comprises uncompressed or raw digital video data that is compressed (encoded) by the encoder pipeline. The input video data is first input through a face detector process, block 102. This process may employ one of several known methods to detect faces within an image, block 104. The process then derives an object detection certainty, block 106, which indicates the degree of confidence that the detected object is a face. The face detection data is then combined with an activity map, block 108. The activity map correlates the mathematical activity level per macroblock for the macroblock or macroblocks that comprise the face region of the image. The bitrate allocation process of the encoder pipeline then allocates an appropriate number of bits for the face depending on the amount of activity, block 110.

Figure 2:
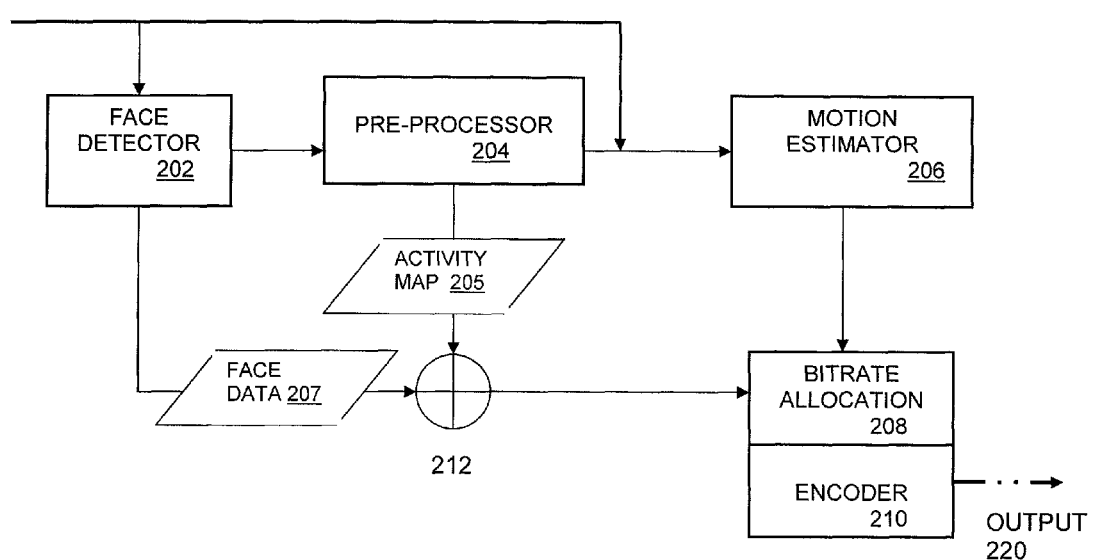
FIG. 2 is a block diagram of an encoder pipeline for detecting subject faces in a videoconferencing system, under an embodiment.

FIG. 2 is a block diagram of an encoder pipeline for detecting subject faces in a videoconferencing system, under an embodiment. The encoder pipeline 201 includes standard components such as an input processor, motion estimator 206, bitrate allocation component 208, and encoder stage 210 to compress input frames 201 into an encoded output bitstream 220.

System 200 illustrates a video encoder pipeline that includes one or more components to implement a face data encoding process for a videoconferencing system, under an embodiment. System 200 includes a face detector module 202 and a combinatorial circuit 212 that work with pre-processor 204 to provide bitrate allocation parameters to the bitrate control module 208.

As shown in FIG. 2, the input frames 201 are input to a face detector component 202 that analyzes the data to detect defined objects, such as faces within a scene. The face detector module 202 of FIG. 2 may be any kind of object detection process or module that isolates a face or other defined object and provides data corresponding to the face or object. In general, face detection is a computer technology that determines the locations and sizes of human faces in arbitrary (digital) images. It detects facial features and ignores anything else, such as buildings, trees, furniture, bodies, and other static objects. The face detection process employs object-class detection to find the locations and sizes of all objects in an image that belong to a given class, which for the system of FIG. 2, are faces of one or more subjects within a scene.

Figure 3:
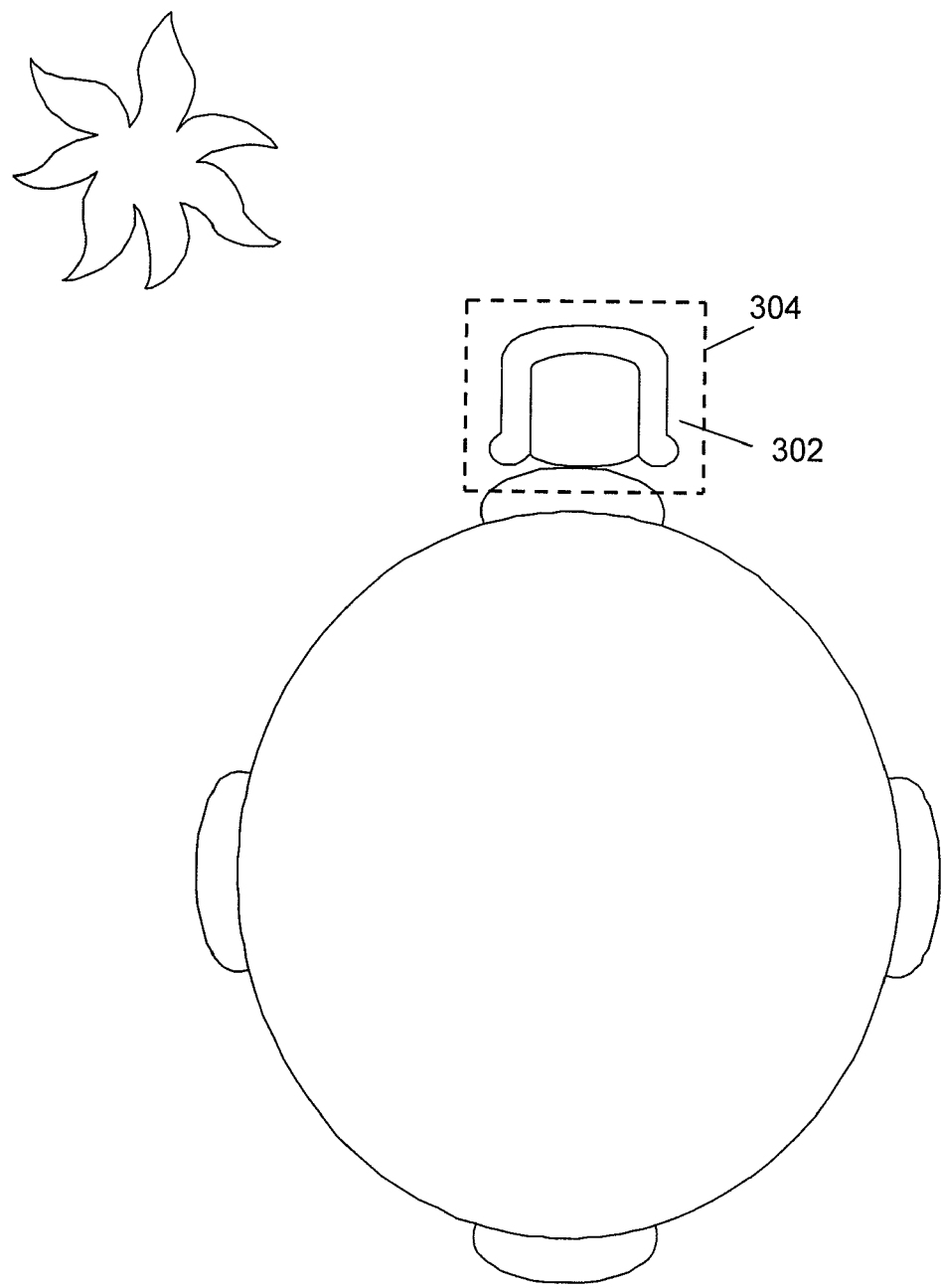
FIG. 3 illustrates the detection of a subject's face in an example videoconference scene, under an embodiment.

FIG. 3 illustrates the detection of a subject face in an example videoconference scene, under an embodiment. As shown in FIG. 3, an example scene 300 represents a typical videoconference environment in which one or more people are present in a room. Various other objects may also be present in the room, such as a table, chairs, plants, equipment, and so on. The face detector process identifies faces of the people and provides location data corresponding to these faces. In FIG. 3, the face detector determines the width and height (X-Y) coordinates of the subject face, 302, and defines a virtual box 304 around this area. This area may be defined in terms of spatial X-Y coordinates, or as a bit-map, or any other appropriate representation depending upon the actual face detection system used.

In a videoconference or similar application, the greatest viewer focus is naturally directed on the face of a speaker. The face detection component 202 allows for isolation of a subject's face and transmission of video data that allows for a more accurate playback of the face data at the receiver. This allows for the intelligible reproduction of facial expressions, emotions, speech pronunciation, and other facial movement to enhance the videoconference experience. The encoder process and system enhances the encoding of the face data related relative to data for other objects within a scene, such as scene 300 in order to allow more accurate rendering of a subject's face. In one embodiment, this is performed by allocating a greater number of bits to the face data than to the other objects, and in certain circumstances this may lead to a relative degradation in playback quality of the other objects. In most cases, however, this effect is insignificant as these objects are not the focus of attention in a scene.

The face detection component 202 may be configured to perform face localization, in which the task is to find the locations and sizes of a number of faces, such as a single face, or multi-view face detection, which can faces that are either rotated along the axis from the face to the observer (in-plane rotation), or rotated along the vertical or left-right axis (out-of-plane rotation), or both.

Figures 4, 5:
FIG. 4 illustrates an example of an activity map for use in the encoder pipeline of FIG. 2, under an embodiment.
FIG. 5 illustrates an example of a relevance range for face versus non-face data under an embodiment.

In system 200, the face detector data is provided to a pre-processor component 204 that differentiates face data from fixed (non-face) data. The pre-processor 204 analyzes each frame of the input stream 201 on a per macroblock basis to determine the mathematical activity level per block. The pre-processor 204 generates an activity map 205 that determines the number of arithmetic operations to process an area of the input image. Activity is generally measured by the amount of pixel difference in a particular area, as opposed to the amount of motion between frames. Thus, for example, an area of solid color will exhibit little or no activity, while a multi-color image (e.g., a flower) will exhibit greater activity. The activity map maps a certain level of activity associated with each region in an area. FIG. 4 illustrates an example of an activity map for use in the encoder pipeline of FIG. 2, under an embodiment. In an activity map, the regions are assigned a numerical value depending upon their relative activity along a defined scale (e.g., 0-100, or any similar scale). In the example activity map 400, the center region with the value 100 denotes a region of much higher activity than the other surrounding regions. In one embodiment, the activity map data 205 comprises a value between 0 and 255 for each region of the map.

The activity map data 205 is combined in combinatorial circuit 212 with face data 207 provided by the face detector module 202. In one embodiment, the face data 207 comprises a value corresponding to the certainty of the face detection. This may be a data value along a defined scale, such as 0-1, or any similar range. The combinatorial circuit 212 may be implemented as a logic module that combines the activity and face data through any appropriate combination algorithm. It may apply a weighted average function or multiplication function with a normalization function to produce combined face/activity data.

The combinatorial logic implemented by the combinatorial circuit 212 can be configured to provide any type of appropriate weighting to the importance of the face data relative to other objects in the scene. This measure can be specified along a range for both the face and non-face objects. FIG. 5 illustrates an example of a relevance range for face versus non-face data under an embodiment. As shown in FIG. 5, a linear scale 502 maps a range of face and non-face data from no importance to full importance for the face object. The face data ranges from a value of 1-to-1 (1.0:1.0) for no importance to 1:0.1 for full importance. In this case, the face data is 10 times more important than the non-face data. Any scale for both the face and non-face data, such as 0-1, 0-10, and so on, can be used in conjunction with the combinatorial logic of circuit 212.

Figure 6:
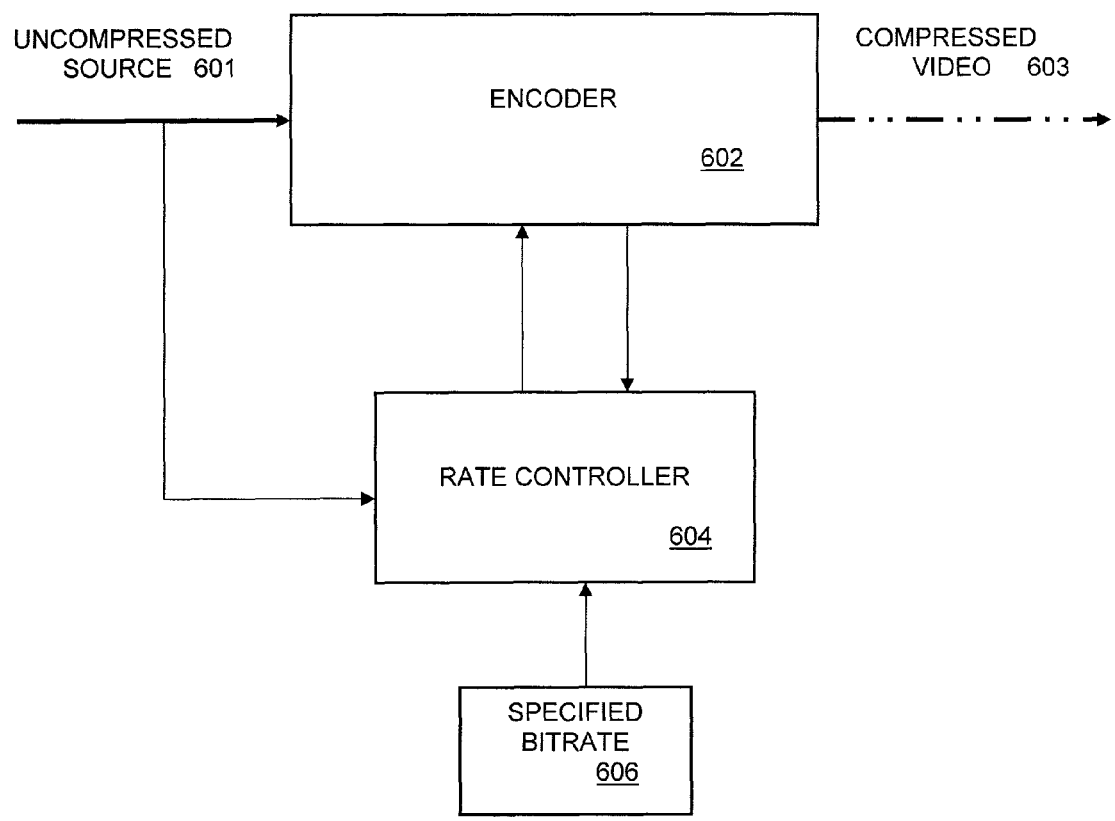
FIG. 6 illustrates a rate controller component for use in a bitrate allocation method for an encoder pipeline incorporating a face detector, under an embodiment.

The output from the combinatorial circuit 212 is then provided to the bitrate control module 208, which dictates the bitrate allocation for each of the blocks. In one embodiment, the bitrate allocation method is implemented through a rate control component. FIG. 6 illustrates a rate controller component for use in a bitrate allocation method for an encoder pipeline incorporating a face detector, under an embodiment. As shown in system 600, an encoder 602 receives uncompressed video data 601 from a source and produces a compressed video signal 603 in accordance with an encoding method, such as standard H.264 encoding. The rate controller component 604 dynamically adjusts encoder parameters to achieve a target bitrate specified by a bitrate parameter 606. The rate controller 604 allocates a budget of bits to each region, individual picture, group of pictures and/or sub-picture in a video sequence. The bitrate algorithm essentially uses the activity map data provided by the pre-processor to determine the activity of the face region relative to the average activity and allocate bits in accordance with what is important. In one embodiment, the bitrate parameter 606 is provided by the output of combinatorial circuit 212 to control the quantization and the fine grained quality of the face object detected by face detector 202. This allows enhanced detail to be provided to the face image.

In one embodiment, face detection method may utilize the motion estimator 206 stage of the encoder pipeline 200. For each macroblock in a current frame, the motion estimator 206 attempts to find a region in a previously encoded frame (reference frame) that is a close match. The spatial offset between the current block and selected block from the reference frame is a motion vector. The encoder 206 computes the pixel-by-pixel difference between the selected block from the reference frame and the current block and transmits a resultant prediction error along with the motion vector. For this embodiment, the output from motion estimator 206 is provided as an input to combinatorial circuit 212. The motion vector data is then combined along with the activity map and face data to provide bitrate allocation parameters to bitrate control module 208.

Embodiments can also be directed to variable block-size motion systems with block sizes as large as 16×16 and as small as 4×4, or intermediate sizes, such as, 16×8, 8×16, 8×8, 8×4, and 4×8.

In an alternative embodiment, the encoder pipeline includes a face detector module and a pre-processing component that analyzes screen images comprising the video data to determine which areas contain a face or other area of interest and divides the screen image into a plurality of regions, including no-change regions, high quality regions, and low quality regions. The pre-processor characterizes each region as requiring a minimum quality level, encodes the low quality regions for compression in accordance with the H.264 encoding standard; and encodes the high quality regions using the lossless compression scheme of the H.264 standard. A no-change region is encoded using a version of the H.264 encoding standard that adaptively and dynamically selects between lossless and lossy compression in a manner that optimizes efficiency of the compression operation for applications, such as videoconferencing. For this embodiment, a modified version of the H.264 specification may be used that analyzes each macroblock of a video sequence using a pre-processing algorithm and transmits certain frames with lossy compression and certain other frames with lossless compression based on certain defined characteristics of the frames. The normal H.264 encoding process is adapted to optimize the use of lossy and lossless transmission. The pre-processing algorithm determines which portions of an image or series of images can be sent using lossy compression, and which should be sent using lossless compression. In one embodiment, objects or areas of interest, e.g., a person's face are sent using lossless compression, while static areas of the image, such as backgrounds and non-critical portions of a subject are can be encoded normally (lossy), as a conventional bit stream with conventional bitrate control. In this manner, screen images are compressed for transmission based on specific areas of the image, with particular attention given to a subject faces, for videoconferencing applications.

The H.264 specification and similar specifications include a provision for sending any individual macroblock of 16×16 pixels as a lossless block with PCM coding. The lossless macroblock coding features of H.264 include a lossless PCM macroblock representation mode in which video data samples are represented directly, allowing perfect representation of specific regions and allowing a strict limit to be placed on the quantity of coded data for each macroblock. An enhanced lossless macroblock representation mode allows perfect representation of specific regions while ordinarily using substantially fewer bits than the PCM mode. For the alternative embodiment, the image is analyzed and characterized in terms of quality regions. A region can be characterized as low quality, high quality, or a no-change region. Low quality regions are encoded using the normal H.264 (or equivalent) coding methods, while high quality regions are encoded using the lossless option in the H.264 (or equivalent) specification. A no-change region is encoded using an implementation of the H.264 encoding standard that adaptively and dynamically selects between lossless and lossy compression in a manner that optimizes efficiency of the compression operation. A no change region has priority in detection over low quality or high quality region. A low quality region may be encoded as no-change if all the bits for a frame have been consumed by the high quality or other prior spatial regions.

Although embodiments described herein have mentioned specific video compression standards, such as H.264, it should be understood that any other appropriate standard may be used, such as H.263, or any other public or proprietary standard. For purposes of this description, "H.264" refers to the standard for video compression that is also known as MPEG-4 Part 10, or MPEG-4 AVC (Advanced Video Coding). H.264 is one of the block-oriented motion-estimation-based codecs developed by the ITU-T Video Coding Experts Group (VCEG) together with the ISO/IEC Moving Picture Experts Group (MPEG). The H.264 specification provides a provision for sending any individual macroblock of 16×16 pixels as a lossless block with PCM (pulse-code modulation) coding. PCM is a digital representation of an analog signal where the magnitude of the signal is sampled regularly at uniform intervals, then quantized to a series of symbols in a numeric (usually binary) code.

Although embodiments have been described in relation to face detection for use in videoconferencing applications, it should be noted that the object detection method and system may be applied to any detectable object type (such as a car, body, hand, document, and so on), for use in any type of video-based application.

The object detection system may be hardware or software embodied or programmed on a graphical processing unit (GPU), central processing unit (CPU) or any combination of GPU and CPU. In a GPU-based system, the GPU may be programmed to offload some or all of the video encoding tasks to the CPU in order to achieve additional performance benefits.

The videoconferencing application may be a point-to-point videoconferencing system, or it may be a simultaneous videoconferencing among three or more remote points, such as made possible by means of a Multipoint Control Unit (MCU) that interconnects calls from several sources (in a similar way to the audio conference call). Such MCU bridges may be configured for IP and ISDN-based videoconferencing and may be embodied as software or hardware systems, or any combination thereof, and which may be implemented as stand-alone devices, or they can be embedded into dedicated video teleconference units. Other videoconference systems may use other standards, such as the H.323 technique known as "decentralized multipoint." In this case, each station in a multipoint call exchanges video and audio directly with the other stations with no central manager.

In one embodiment, the face detector component 202 may be provided as a component within the encoder pipeline 200. Alternatively, it may be provided as part of the video camera system. In this embodiment, the input frames 201 from the source camera include face data along with the raw video frames, and this data is input directly to combinatorial circuit 212 in the encoder pipeline 200.

Although embodiments have been described with reference to graphics systems comprising GPU devices or visual processing units (VPU), which are dedicated or integrated graphics rendering devices for a processing system, it should be noted that such embodiments can also be used for many other types of video production engines that are used in parallel. Such video production engines may be implemented in the form of discrete video generators, such as digital projectors, or they may be electronic circuitry provided in the form of separate IC (integrated circuit) devices or as add-on cards for video-based computer systems.

In one embodiment, the system including the GPU control system comprises a computing device that is selected from the group consisting of: a personal computer, a workstation, a handheld computing device, a digital television, a media playback device, smart communication device, and a game console, or any other similar processing device.

Aspects of the system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects of the face detection and encoding system may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

Some of the systems and/or components described herein may be implemented as one or more electronic circuits. Such circuits described herein can be implemented through the control of manufacturing processes and maskworks, which would be then used to manufacture the relevant circuitry. Such manufacturing process control and maskwork generation known to those of ordinary skill in the art include the storage of computer instructions on computer readable media including, for example, Verilog, VHDL or instructions in other hardware description languages.

The various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on). Additionally, embodiments may comprise applications which enable video encoding (such as video editing software, content creation software and the like). Such applications may include instructions which program general and/or special purpose processors (such as CPUs and/or GPUs or combinations thereof) to implement aspects of the invention described herein. Such applications may generate encoded video data which were produced in manners described herein.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the face detection and encoding system is not intended to be exhaustive or to limit the embodiments to the precise form or instructions disclosed. While specific embodiments of, and examples for, processes in graphic processing units or ASICs are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the disclosed system in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed embodiments are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A method comprising:
   receiving digital video frames of an image including a plurality of objects in a scene, wherein the frames comprise a plurality of blocks defined by an encoding scheme;
   detecting the plurality of objects through a visual object detection process to derive object detection data;
   determining a mathematical activity level for each block of each frame;
   combining the object detection data with the mathematical activity level to determine bit allocation value; and
   using the bit allocation value to determine a number of bits to encode the detected plurality of objects, wherein the plurality of defined objects is allocated a greater number of bits relative to other objects;
   wherein the mathematical activity level is provided as an activity map indicating an amount of change among pixels in each block of the plurality of blocks, wherein the combining step comprises multiplying the activity map data with the face data and applying a normalization factor to produce a bitrate allocation parameter.

2. The method of claim 1 wherein the plurality of objects are faces of a person in the scene, and wherein the object detection process comprises a face detection process using visual facial features.

3. The method of claim 2 wherein the face detection process provides face data comprising location data for the face within the scene as one of spatial coordinate data or bitmap data.

4. The method of claim 3 wherein the face data further comprises the level of object detection certainty of the face.

5. The method of claim 1 wherein a region of relatively high activity in the activity map corresponds to a block containing an area of high contrast between pixels within the block.

6. The method of claim 1 further comprising:
   performing a motion estimation process on the digital video frames to produce one or more motion vectors that represent a degree of change of pixels from a first frame to a second frame in the consecutive frames of the image; and
   combining the motion vectors with the face data and activity map data.

7. The method of claim 1 wherein the plurality of blocks comprises macroblocks, and the encoding scheme comprises the MPEG-4 AVC (Advanced Video Coding) scheme.

8. The method of claim 7 wherein the macroblocks are of a size corresponding to one of 16×16 pixels, 8×8 pixels, or 4×4 pixels.

9. An apparatus comprising:
   an input stage receiving digital video data consisting of image frames depicting a plurality of objects in a scene;
   an object detector coupled to the input stage and detecting the presence of the plurality of objects to generate object data comprising location information of the object within the scene;
   a pre-processor coupled to the object detector and analyzing the image frames to determine an amount of mathematical activity in each of a defined number of blocks of the image frames to generate activity data;
   a combinatorial logic circuit combining the object data and the activity data to generate a bitrate allocation parameter; and
   a bitrate control module coupled to the combinatorial logic circuit assigning a number of bits to encode the object using the bitrate allocation parameter, wherein the plurality of defined objects is allocated a greater number of bits relative to other objects,
   wherein the amount of mathematical activity in each of a defined number of blocks is provided as an activity map indicating an amount of change among pixels in each block of the plurality of blocks, wherein the combinatorial logic circuit multiplies the activity map data with the face data and applying a normalization factor to produce a bitrate allocation parameter.

10. The apparatus of claim 9 wherein the digital video data comprises video data generated in a videoconference system, the system comprising:
    a video capture device;
    a video encoder system receiving data from the video capture device and compressing the data according to an encoding specification;
    a transmission link coupled to the video encoder system; and a video decoder system receiving the compressed data over the transmission link and decoding the compressed data in accordance with the encoding specification.

11. The apparatus of claim 10 encoding specification comprises the MPEG-4 AVC (Advanced Video Coding) scheme.

12. The apparatus of claim 11 wherein the object is a face of a person in the scene, and wherein the object detector comprises a face detector, and further wherein the face detector provides face data comprising location data for the face within the scene as one of spatial coordinate data or bitmap data, and a level of object detection certainty of the face.

13. The apparatus method of claim 9 further comprising a motion estimation component receiving the digital video frames and producing one or more motion vectors that represent a degree of change of pixels from a first frame to a second frame in the consecutive frames of the image, and providing the motion vectors to the combinatorial logic circuit for combination with the face data and activity map data.

* * * * *